(12) United States Patent
Zhang et al.

(10) Patent No.: US 9,800,902 B2
(45) Date of Patent: Oct. 24, 2017

(54) DIGITAL TELEVISION NETWORK STRUCTURE AND USER TERMINAL

(71) Applicant: Shanghai National Engineering Research Center of Digital Television Co., Ltd., Shanghai (CN)

(72) Inventors: WenJun Zhang, Shanghai (CN); DaZhi He, Shanghai (CN); Yin Xu, Shanghai (CN); Yunfeng Guan, Shanghai (CN); Yanfeng Wang, Shanghai (CN); Yao Wang, Shanghai (CN); Jun Sun, Shanghai (CN); Yang Dai, Shanghai (CN); Weiqiang Liang, Shanghai (CN); Ge Huang, Shanghai (CN)

(73) Assignee: SHANGHAI NATIONAL ENGINEERING RESEARCH CENTER OF DIGITAL TELEVISION CO., LTD., Shanghai (CN)

( * ) Notice: Subject to any disclaimer, the term of this patent is extended or adjusted under 35 U.S.C. 154(b) by 220 days.

(21) Appl. No.: 14/413,228

(22) PCT Filed: Jul. 5, 2013

(86) PCT No.: PCT/CN2013/078859
§ 371 (c)(1),
(2) Date: Jan. 6, 2015

(87) PCT Pub. No.: WO2014/005545
PCT Pub. Date: Jan. 9, 2014

(65) Prior Publication Data
US 2015/0181259 A1    Jun. 25, 2015

(30) Foreign Application Priority Data

Jul. 6, 2012 (CN) .......................... 2012 1 0233932
Jul. 6, 2012 (CN) .......................... 2012 1 0233971
(Continued)

(51) Int. Cl.
*H04N 21/222* (2011.01)
*H04L 12/18* (2006.01)
(Continued)

(52) U.S. Cl.
CPC ....... *H04N 21/222* (2013.01); *H04L 12/1836* (2013.01); *H04N 21/23109* (2013.01);
(Continued)

(58) Field of Classification Search
CPC ....... H04N 21/23109; H04N 21/64784; H04N 21/4348; H04N 21/4622; H04N 21/47202;
(Continued)

(56) References Cited

U.S. PATENT DOCUMENTS 5,924,013 A * 7/1999 Guido ................ H04N 21/6581
348/E5.108
6,968,153 B1 * 11/2005 Heinonen ............. H04W 88/04
370/338
(Continued)

FOREIGN PATENT DOCUMENTS

CN      1874488 A     12/2006
CN    101094378 A     12/2007
(Continued)

OTHER PUBLICATIONS

International Search Report and Written Opinion for PCT/CN2013/078859.

*Primary Examiner* — Chenea Smith
(74) *Attorney, Agent, or Firm* — Kilpatrick Townsend & Stockton LLP

(57) ABSTRACT

This invention discloses a digital TV broadcast system coordinated with a broadband communication network, an information transmission network in which the broadcast system is applied, a digital TV heterogeneous network architecture, and a client terminal used in each of the above network systems. The various broadcast system architectures of the invention adopt the design concept of heterogeneous network which integrates a broadcast network with other networks, for example, a communication network, the Internet and the like, to form a heterogeneous network architecture coordinating various networks. Meanwhile, the usage in bad conditions are taken into account, and a broadcast TV system which enables uplink transmission by using a broadcast link is designed. The terminal of the invention is a terminal applicable in these heterogeneous network architectures, is capable of receiving signals transmitted from various networks, and can enable flexible receiving and access modes with a series of control means. The network system and client terminal of the invention can achieve an optimized allocation of network resources, save spectrum resources, and enable optimized transmission and management of information resources.

4 Claims, 5 Drawing Sheets

(30) Foreign Application Priority Data

| | | |
|---|---|---|
| Jul. 6, 2012 | (CN) | 2012 1 0233974 |
| Jul. 7, 2012 | (CN) | 2012 1 0233919 |

(51) Int. Cl.

| | |
|---|---|
| *H04N 21/231* | (2011.01) |
| *H04N 21/236* | (2011.01) |
| *H04N 21/434* | (2011.01) |
| *H04N 21/462* | (2011.01) |
| *H04N 21/6375* | (2011.01) |
| *H04N 21/258* | (2011.01) |
| *H04N 21/482* | (2011.01) |
| *H04N 21/658* | (2011.01) |
| *H04N 21/61* | (2011.01) |
| *H04N 21/647* | (2011.01) |
| *H04N 21/472* | (2011.01) |

(52) U.S. Cl.

CPC . *H04N 21/23614* (2013.01); *H04N 21/25891* (2013.01); *H04N 21/4348* (2013.01); *H04N 21/4622* (2013.01); *H04N 21/482* (2013.01); *H04N 21/6112* (2013.01); *H04N 21/6118* (2013.01); *H04N 21/6125* (2013.01); *H04N 21/6375* (2013.01); *H04N 21/64784* (2013.01); *H04N 21/6581* (2013.01); *H04N 21/47202* (2013.01)

(58) Field of Classification Search

CPC ......... H04N 21/6375; H04N 21/25891; H04N 21/482; H04N 21/6581; H04N 21/222; H04N 21/6112; H04N 21/6118; H04N 21/6125; H04N 21/23614; H04L 12/1836

See application file for complete search history.

(56) References Cited

U.S. PATENT DOCUMENTS

| | | | |
|---|---|---|---|
| 2001/0018713 A1 | 8/2001 | Kokado et al. | |
| 2007/0157241 A1* | 7/2007 | Walker | H04N 5/782 725/46 |
| 2007/0177593 A1* | 8/2007 | Kompella | H04L 12/18 370/390 |
| 2008/0090513 A1* | 4/2008 | Collins | G06Q 30/0251 455/3.01 |
| 2012/0059825 A1* | 3/2012 | Fishman | G06F 17/30053 707/737 |
| 2012/0143994 A1* | 6/2012 | Calcev | G06F 17/30817 709/219 |
| 2013/0010748 A1* | 1/2013 | Novak | H04L 5/0007 370/330 |

FOREIGN PATENT DOCUMENTS

| | | |
|---|---|---|
| CN | 201491019 U | 5/2010 |
| CN | 101742208 A | 6/2010 |
| CN | 102185619 A | 9/2011 |
| CN | 102223571 A | 10/2011 |

\* cited by examiner

DIGITAL TELEVISION NETWORK STRUCTURE AND USER TERMINAL

This application is a US National Stage of International Application No. PCT/CN2013/078859, filed on 5 Jul. 2013, designating the United States, and claiming priority to Chinese Patent Application No. 201210233919.6, 201210233932.1, 201210233971.1, and 201210233974.5, all filed with the Chinese Patent Office on Jul. 6, 2012, the content of which are hereby incorporated by reference in its entirety.

TECHNICAL FIELD

The invention relates to a broadcast communication system architecture and receiving terminals used within the system, and more particularly to a digital television (TV) network architecture and client terminals.

BACKGROUND

The conventional terrestrial digital TV transmission systems widely employ a single-frequency network architecture, namely, TV towers at different locations transmit the same signal at the same frequency simultaneously.

The disadvantage is that the number of the transmit towers and the transmit power are subject to certain constraints. For urban topography, there will be many shadow areas for indoor reception, and for rural topography, the coverage range will be limited in some extent. On the other hand, the conventional digital TV transmission system is for one-way broadcast. This one-way broadcast mode transmits a fixed number of video programs with limited bandwidth, without taking into account the specific service needs of users, e.g., two-way services such as video on-demand, information customization, games, etc.

SUMMARY

The invention intends to provide a digital TV network architecture and client terminal, to solve the inadequacy of the only existing broadcast approach, the incapability in integrating and sharing with other networks, and the improper allocation of broadcast and network resources.

According to the aforementioned purpose, a client terminal according to this invention is implemented, wherein the client terminal comprises: a first receiving module for connecting with a broadband communication network, and a second receiving module for connecting with a digital TV broadcast system, wherein the client terminal is operable to receive, via the second receiving module, an information index transmitted by the digital TV broadcast system, and to retrieve corresponding information content from the broadband communication network via the first receiving module based on the information index.

According to the above main features, the client terminal receives, via the second receiving module, the content transmitted by the digital TV broadcast system, and selectively stores and recommends the content according to a user's behavior habits.

According to the above main features, the client terminal is operable to directly retrieve information content from the broadband communication network via the first receiving module.

According to the above main features, the broadband communication network deploys an edge server that is close to the client terminal, wherein the client terminal connects to the broadband communication network via the edge server.

According to the above main features, the digital TV broadcast system coordinates with the broadband communication network by connecting to a content clustering server, wherein the content clustering server chooses popular content from a plurality of data sources and generates an information index, wherein the information index of the popular content is sent to the client terminal via the digital TV broadcast system and the second receiving module, such that the client terminal is operable to retrieve the corresponding popular content from the edge server via the first receiving module based on the information index of the popular content.

According to the above main features, the client terminal is connected to the digital TV broadcast system through a wireless digital broadcast channel.

According to the above main features, the client terminal selectively downloads some of the popular content from the edge server to the client terminal according to a user's behavior habits, and recommends the content to the user.

According to the aforementioned purpose, a digital TV broadcast system coordinated with a broadband communication network according to this invention is implemented, for providing information to a client terminal, wherein the broadband communication network comprises an edge server that is close to the client terminal, wherein a bidirectional information channel is provided between the client terminal and the edge server, a broadcast information channel is provided between the digital TV broadcast system and the edge server, and a broadcast information channel is provided between the digital TV broadcast system and the client terminal.

According to the above main features, the digital TV broadcast system coordinates with the broadband communication network by connecting to a content clustering server, wherein the content clustering server performs clustering analysis on multimedia content from a plurality of data sources based on the sources of the content, analysis and prediction of relevance between the content and users, and feedback information to the content including user's click response, to identify the multimedia content as popular content or normal content, so as to choose, classify and index the popular content.

According to the above main features, the content clustering server sends the popular content to the edge server through the information channel between the digital TV broadcast system and the edge server.

According to the above main features, the digital TV broadcast system sends the popular content or its index directly to the client terminal through the information channel between the digital TV broadcast system and the client terminal.

According to the above main features, the digital TV broadcast system sends the popular content or its index to the client terminal through the information channel between the digital TV broadcast system and the client terminal, wherein the client terminal retrieves the corresponding popular content from the edge server via the information channel between the client terminal and the edge server based on the index of the popular content.

According to the above main features, the content clustering server sends all the content to the broadband communication network, and the client terminal is connected to the broadband communication network via the information channel between the client terminal and the edge server.

According to the above main features, the information channel between the digital TV broadcast system and the edge server comprises a cable digital broadcast channel, a satellite digital broadcast channel, or a terrestrial digital broadcast channel.

According to the above main features, the information channel between the digital TV broadcast system and the client terminal comprises a wireless digital broadcast channel.

According to the above main features, the information channel between the digital TV broadcast system and the edge server and the information channel between the digital TV broadcast system and the client terminal are two logical channels on one physical channel.

According to the above main features, the information channel between the digital TV broadcast system and the edge server and the information channel between the digital TV broadcast system and the client terminal are two different physical channels.

According to the aforementioned purpose, an information transmission network according to the invention is implemented, for providing information to a client terminal, wherein the information transmission network comprises a broadband communication network and a digital TV broadcast system, wherein the broadband communication network comprises an edge server that is close to the client terminal, wherein a bidirectional information channel is provided between the client terminal and the edge server, a broadcast information channel is provided between the digital TV broadcast system and the edge server, and a broadcast information channel is provided between the digital TV broadcast system and the client terminal.

According to the above main features, the information transmission network further comprises a content clustering server connected to the broadband communication network and the digital TV broadcast system, wherein the content clustering server performs clustering analysis on multimedia content from a plurality of data sources based on the sources of the content, analysis and prediction of relevance between the content and users, and feedback information to the content including user's click response, to identify the multimedia content as popular content or normal content, so as to choose, classify and index the popular content.

According to the above main features, the content clustering server sends the popular content to the edge server through the information channel between the digital TV broadcast system and the edge server.

According to the above main features, the digital TV broadcast system sends the popular content or its index directly to the client terminal through the information channel between the digital TV broadcast system and the client terminal.

According to the above main features, the digital TV broadcast system sends the popular content or its index to the client terminal through the information channel between the digital TV broadcast system and the client terminal, wherein the client terminal retrieves the corresponding popular content from the edge server via the information channel between the client terminal and the edge server based on the index of the popular content.

According to the above main features, the content clustering server sends all the content to the broadband communication network, and the client terminal is connected to the broadband communication network via the information channel between the client terminal and the edge server.

According to the above main features, the information channel between the digital TV broadcast system and the edge server comprises a cable digital broadcast channel, a satellite digital broadcast channel, or a terrestrial digital broadcast channel.

According to the above main features, the information channel between the digital TV broadcast system and the client terminal comprises a wireless digital broadcast channel.

According to the above main features, the information channel between the digital TV broadcast system and the edge server and the information channel between the digital TV broadcast system and the client terminal are two logical channels on one physical channel.

According to the above main features, the information channel between the digital TV broadcast system and the edge server and the information channel between the digital TV broadcast system and the client terminal are two different physical channels.

According to the aforementioned purpose, a digital TV heterogeneous network architecture of the invention is implemented for providing digital TV content to a client terminal, wherein the digital TV heterogeneous network architecture comprises: a transmission control module, a broadcast TV network and a secondary network, wherein both the broadcast TV network and the secondary network are connected to the transmission control module, wherein the broadcast TV network is a unidirectional transmission network for sending the digital TV content to the client terminal directly, and the secondary network is a bidirectional network for transmitting the digital TV content to the client terminal and for transmitting control information between the client terminal and the transmission control module, wherein the transmission control module governs the digital TV content to be transmitted via the broadcast TV network and the secondary network.

According to the above main features, the broadcast TV network further comprises a multiplexing and distribution module connected to the transmission control module, for performing channel multiplexing and content distribution for the content output from the transmission control module; wherein the channel multiplexing means that a plurality pieces of content might occupy one frequency resource chronologically or a plurality pieces of content might occupy one time block at different frequency resources.

According to the above main features, the control information comprises a VOD request, a broadcast content retransmission request, or a direct video content request.

According to the above main features, the digital TV content comprises broadcast content as well as VOD content for the client terminal.

According to the above main features, the secondary network comprises a 3G, LTE, or WiFi network and the wired Internet, wherein the 3G, LTE, or WiFi network is used to connect the client terminal with the Internet, wherein the client terminal uploads control information or video content to the Internet via the 3G, LTE, or WiFi network. The Internet delivers feedback information, broadcast retransmission content or direct video content from the transmission control module to the client terminal via the 3G, LTE, or WiFi network; wherein the feedback information comprises acceptance, waiting, or timeout of a VOD request, acceptance, waiting, or timeout of a broadcast content retransmission request, or acceptance, waiting, or timeout of a direct content request.

According to the above main features, the client terminal further comprises a storage device, for storing the digital TV content transmitted to the client terminal from the broadcast TV network or the secondary network.

According to the above main features, the broadcast TV network architecture further comprises a content classification and preparation module connected to the transmission control module, for classifying acquired digital TV content and further creating an index label for each piece of multimedia content.

According to the above main features, the broadcast TV network architecture further comprises a content acquisition module connected to the content classification and preparation module, for acquiring digital TV content from various sources.

According to the above main features, the secondary network has a plurality of information transmission channels, and the client terminal comprises an evaluation unit for evaluating a channel condition in real-time based on return channels of the information transmission channels, so as to select an optimal information transmission channel.

According to the aforementioned purpose, a terrestrial digital TV network architecture according to this invention is implemented, wherein the terrestrial digital TV network architecture comprises: a TV tower base station and a client terminal; wherein a downlink at a first frequency and an uplink at a second frequency are employed between the TV tower base station and the client terminal.

According to the above main features, the downlink carries broadcast information transmitted to all users in a broadcast mode and proprietary information specific to individual users transmitted in a broadcast or directional transmission mode; and the uplink is accessed according to a time-frequency resource table specified individually and delivered on the downlink.

According to the above main features, an uplink signal is transmitted by the client terminal in a directional transmission mode; wherein the directional transmission mode is implemented by a directional antenna or through beamforming of an antenna array.

According to the above main features, a wireless repeater is also included, wherein the TV tower base station transmits a broadcast signal to the wireless repeater, which forwards the broadcast signal to the client terminal; wherein the client terminal transmits an uplink signal to the wireless repeater, which forwards the uplink signal to the TV tower base station.

According to the above main features, the wireless repeater comprises a pair of back-to-back wireless access points, one for receiving and the other for transmitting; the wireless repeater utilizes analog intra-frequency forwarding, analog inter-frequency forwarding, digital intra-frequency forwarding, or digital inter-frequency forwarding, or utilizes Bluetooth or Wifi forwarding.

According to the aforementioned purpose, a TV tower base station of this invention is implemented for transceiving signals with a client terminal, wherein: the TV tower base station comprises a receiving device and a transmitting device, wherein the transmitting device transmits information to the client terminal at a first frequency, and the receiving device receives information transmitted from the client terminal at a second frequency.

According to the above main features, the information transmitted by the transmitting device comprises broadcast information transmitted to all users in a broadcast mode, and proprietary information specific to individual users transmitted in a broadcast or directional transmission mode.

According to the above main features, the receiving device receives the information transmitted from the client terminal according to a time-frequency resource table for the client terminal.

According to the aforementioned purpose, a client terminal of this invention is implemented for transceiving signals with a TV tower base station, wherein: the client terminal comprises a receiving device and a transmitting device, wherein the receiving device receives information transmitted from the TV tower base station at a first frequency, and the transmitting device transmits information to the TV tower base station at a second frequency.

According to the above main features, the client terminal transmits information to the TV tower base station in a directional transmission mode, wherein the directional transmission mode is implemented by a directional antenna or through beamforming of an antenna array.

With the technical solutions of the invention, the integration of the broadcast network and other networks is provided, to support multiple network access modes for users, and to provide accurate, efficient, and high quality information services to users with best efforts. Moreover, such heterogeneous architectures utilize the WiFi/GPRS/3G, LTE and broadcast networks in a site-specific way to provide a collaborative coverage to solve the blind spots and shadows in the cities. In addition, the network architecture of the invention can support an uplink of broadcasting and also utilizes the different advantages of various networks in coverage range, transmission speed, mobility support, QoS support, setup cost, and targeting market, which are complementary to each other, thereby providing services with more variety, higher quality, and lower price for users.

BRIEF DESCRIPTION OF THE DRAWINGS

In this invention, like reference numerals refer to like parts throughout the drawings, in which.

DETAILED DESCRIPTION

The technical solutions of this invention will be further described below in connection with the figures and embodiments.

As seen from the prediction in the Background, the explosive increase in demands for video data services places a heavy burden on the broadband communication network; while the high homogenity of a large amounts of data services makes it possible for the digital TV broadcast system to assist the broadband communication network. Accordingly, the digital TV broadcast system and the broadband communication network of multimedia data are inevitably integrated and complement each other. Thus, this invention proposes a network architecture coordinated with the broadband communication network, and is particularly applicable in the digital TV broadcast system.

Figure 1:
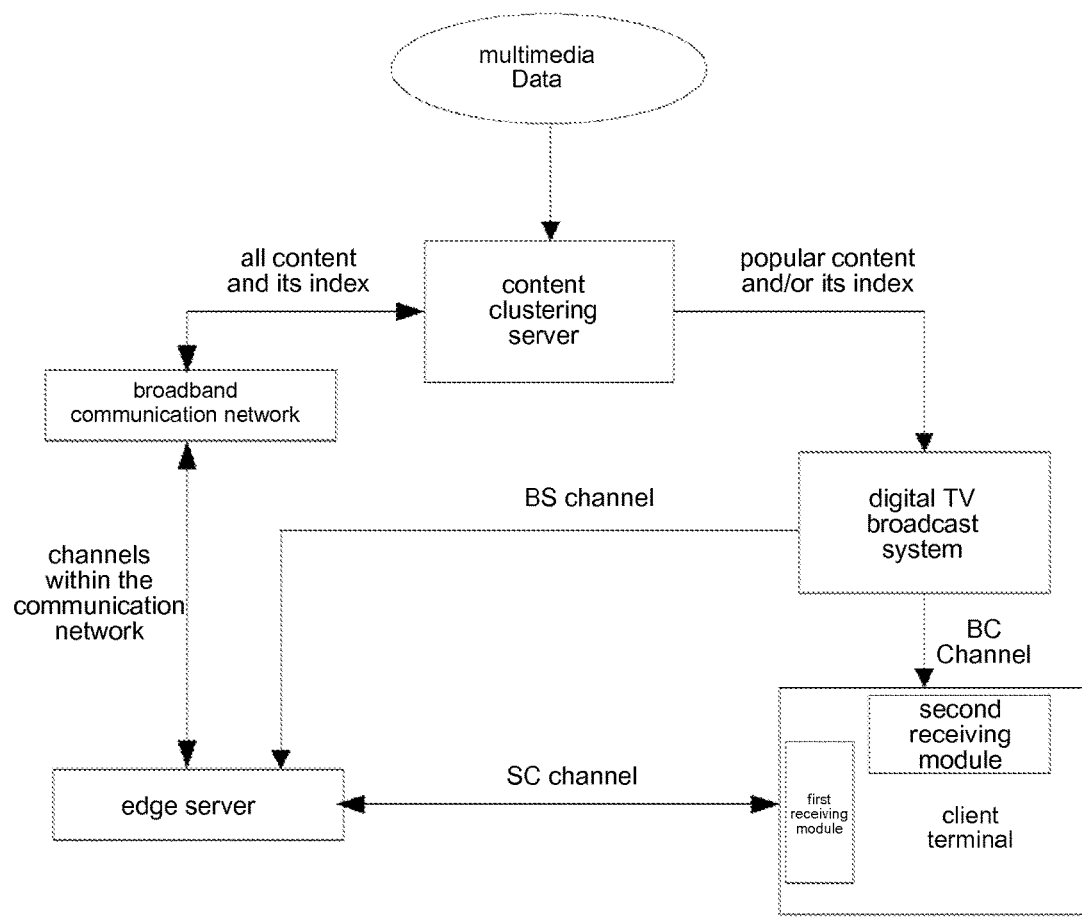
FIG. 1 is a schematic diagram of an information transmission network combining a digital TV broadcast system and a broadband communication network according to a first embodiment of the invention.

As shown in FIG. 1, with a network architecture that coordinates the broadband communication network and the digital TV broadcast system, the information transmission network of this invention is operable for providing information to a client terminal, and mainly includes two sub-networks, the broadband communication network and the digital TV broadcast system. The broadband communication network includes a plurality of servers in the network. Particularly in this invention, a server close to the client terminal is referred as an edge server, wherein a bidirectional information channel is provided between the client terminal and the edge server, an information channel is provided between the digital TV broadcast system and the edge server, and an information channel is provided between the digital TV broadcast system and the client terminal.

The edge server is deployed at the backend of the digital TV broadcast system and the broadband communication network. The digital TV broadcast system is connected to the client terminal, forming a Broadcast-to-Client (BC) channel, the digital TV broadcast system is connected to the edge server, forming a Broadcast-to-Server (BS) channel, and the client terminal is connected to the edge server, forming a Server-to-Client (SC) channel.

Among the above three channels, the SC channel is a bidirectional channel, for interconnectivity between the client and the broadband communication network. The BC channel and the BS channel may be two logical channels on one physical channel, wherein the BC channel and the BS channel multiplexes the physical channel by time-division multiplexing or frequency-division multiplexing. In another aspect, the BC channel and the BS channel may simply be two different physical channels. Regardless the form of the BC channel and the BS channel, the BC channel and the BS channel are not limited to unidirectional channels. In other words, both the BC channel and the BS channel may include an uplink, wherein the uplink and downlink of the BC channel and the BS channel are differentiated by different frequency bands.

In consideration of the unidirectional or bidirectional characteristics of the BC channel, the BS channel and the SC channel, the BS channel may be a cable digital broadcast channel, or a satellite digital broadcast channel, or a terrestrial digital broadcast channel, the BC channel may be a wireless digital broadcast channel, and the SC channel may be a common wired network channel, or a Wifi channel, etc.

The multimedia data firstly undergoes content clustering. Accordingly, the information transmission network of this invention further comprises a content clustering server, which is connected to the broadband communication network and the digital TV broadcast system, and which is deployed at frontend of the digital TV broadcast system and the broadband communication network.

The content clustering server first analyzes popularity of various multimedia data based on the sources of the multimedia content, analysis and prediction of relevance between the content and users, and feedback information to the content including user's click response, and chooses the content that most people concern (i.e., popular content), such that the popular content is separated from normal content. Next, the popular content is further processed to extract key words of the multimedia data based on the popularity characteristics of the multimedia data, which may then be indexed by the key words, and all the indices are managed collectively on the content clustering server.

For each multimedia data label, the content clustering server needs to continuously update its popularity, so as to update the key words and the corresponding index. Accordingly, the popularity and index of multimedia data are dynamic parameters. For example, in a period of time, some multimedia content is concerned by many people, and the multimedia content becomes popular. After a time period, the concern for the multimedia content decreases, and then the content clustering server may modify the label of the multimedia content from popular to normal. Finally, the digital TV broadcast system assists the broadband communication network to deliver the popular content.

During the data delivery, the content clustering server groups the multimedia data into two clusters: one cluster for the popular content in all the multimedia data and its information index, the other cluster for content of all the multimedia data. The content clustering server delivers the two clusters through two different networks.

The first network is the digital TV broadcast system, for delivering the popular content and/or the information index of the content. The transmission on the digital TV broadcast system is carried through a BS channel and a BC channel. The BS channel transmits the popular content directly to the edge server close to the terminal, and the BC channel transmits the popular content and/or the information index of the content directly to the client terminal. Alternatively, the client terminal may retrieve the full information of the corresponding popular content from the edge server via the SC channel based on the information index of the popular content.

The secondary network is the broadband communication network, for delivering all the multimedia data and the information index thereof. The content clustering server delivers all the content and the information index thereof to the broadband communication network. The edge server is capable of both receiving the BS channel and accessing the broadband communication network. The client terminal connects to the broadband communication network via the SC channel, so as to retrieve the information index of all the multimedia data and the full content.

Figure 2:
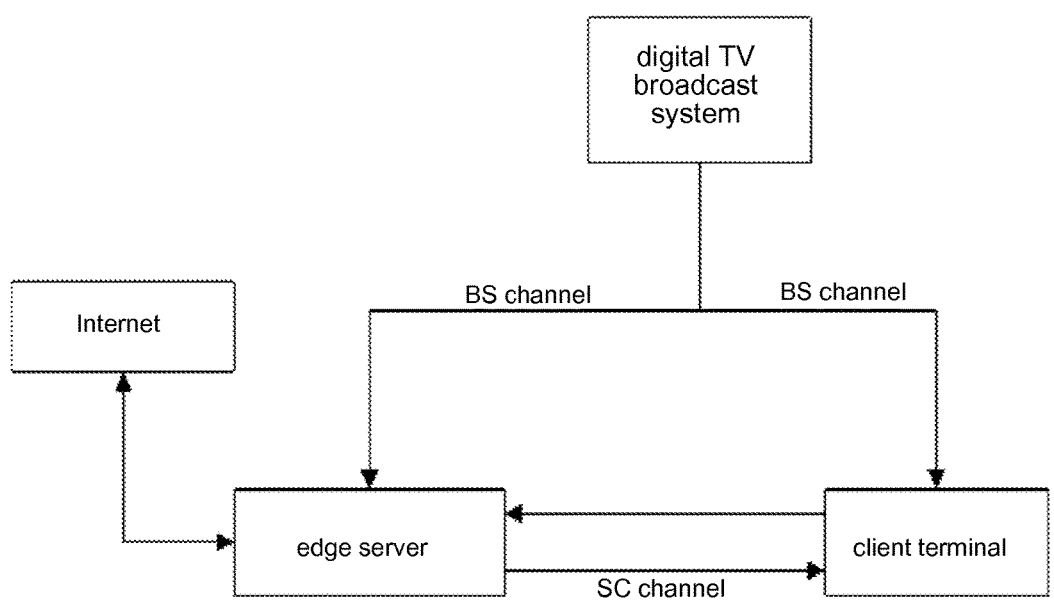
FIG. 2 is a schematic block diagram of a Broadcast-to-Client channel and a Broadcast-to-Server channel in FIG. 1.

As a preferred embodiment of this invention, FIG. 2 illustrates the content clustering, BS channel and BC channel which constitute three essential parts of this invention. The BS channel may be a cable digital broadcast channel, a satellite digital broadcast channel, or a terrestrial digital broadcast channel, which is of high spectrum efficiency. A large amount of popular multimedia data can be delivered to the edge server directly via the BS channel. The BC channel merely employs wireless digital broadcasting, can be widely deployed, can accommodate different requirements of terminals, and benefits power saving in some extent.

Broadcasting is characterized in the point-to-plane information transmission. The delivery of the popular content through the digital TV broadcast system may offload a high traffic from the broadband communication network. The client terminal receives the broadcast popular content and its information index via the BC channel, may selectively store some popular content for recommendation according to user's behavior habits, and may also store the index information of the popular content. The user may select information based on the recommendation from the client terminal, the index information or other requirements. Although the user does not concern the source of the information, the three different access modes can ensure the user to obtain the required information more quickly and accurately. Based on the user's needs, the user may decide whether to browse the recommended content, whether to browse all the content of the index information, or whether to inquire about other information. If the user simply browses the content recommended by the terminal, the information may be found on the client terminal itself; if the user is interested in specific content of the index information, such information may be retrieved from the nearest edge server via the SC channel; or if the user want to query other content information, the Internet may be accessed via the edge server for information query and browsing.

The integration of the digital TV broadcast system with the broadband communication network is a trend in the next generation of network architecture. Such an architecture may leverage the characteristic of point-to-plane transmission of the digital TV broadcast system, separate and index the popular content by the content clustering server, and deliver the content that most people concern directly via the BC channel, thereby significantly reducing the traffic load on the broadband communication network. By analyzing the user's behaviors, the terminal may store and recommend the content that the user may concern. Meanwhile, the content may be delivered to the edge server via the BS channel, so as to reduce the access distance between the user and most content. Such a digital TV broadcast architecture provides multiple access modes for users, and is capable of providing accurate, efficient and high quality information services for users with best efforts. The digital TV broadcast system combined with the broadband communication network becomes the information highway in the new era, whereby a large amount of multimedia data may be delivered to the user quickly and accurately by broadcasting.

As the continuous development of digital TVs and the trends of diversity and interaction of networks, the integration and heterogeneity based on the coexistence of multiple network become a considerable trend of the future digital TV wireless signal communication development. The various networks have different advantages in coverage range, transmission speed, mobility support, QoS support, setup cost, and targeting market, and are complementary to each other. The network integration intends to utilize the complementary characteristics of the heterogeneous networks, so as to provide services with more variety, higher quality, and lower prices for users.

Figure 3:
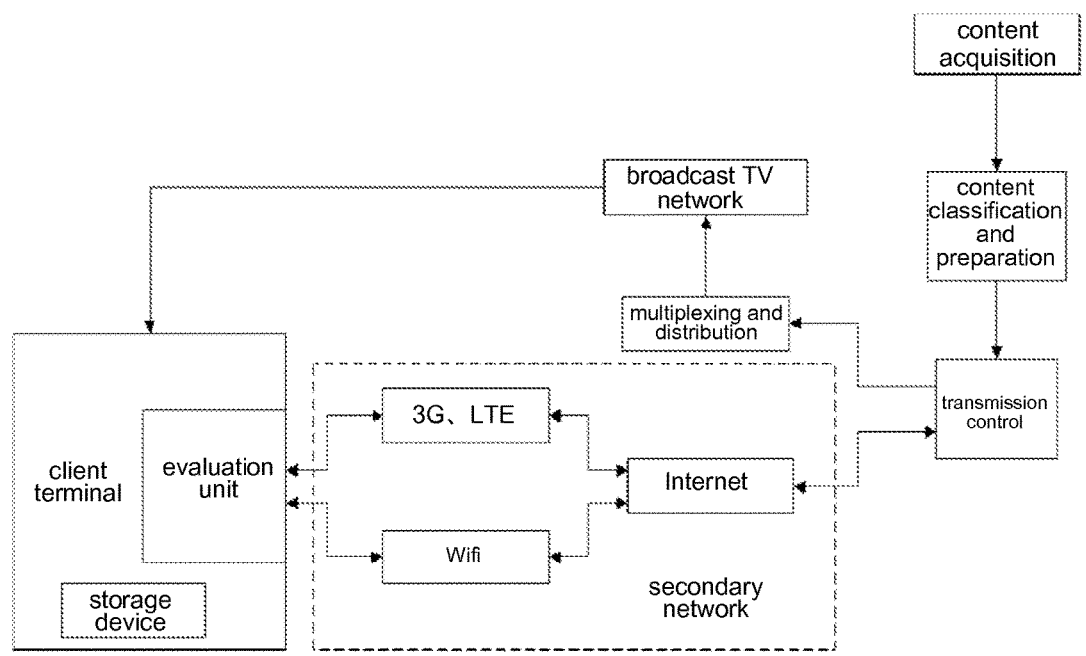
FIG. 3 is a schematic diagram of a digital TV heterogeneous network architecture according to a second embodiment.

A terrestrial broadcast TV network architecture established with the concept of heterogeneous networks and having a return link and a collaborative coverage function is shown in FIG. 3, and mainly comprises a content acquisition module, a content classification and preparation module, a transmission control module, a broadcast TV network, a secondary network, a client terminal and a storage device. The digital TV content of this invention comprises broadcast content as well as VOD content for the client terminal. In particular, as an alternative embodiment of this invention, the broadcast TV network is a broadcast network, the secondary network is a 3G, LTE or WiFi network. Alternatively, the secondary network may be an analog intra-frequency (on-channel) forwarding, digital intra-frequency (differential-channel) forwarding, or digital inter-frequency forwarding communication system, and this invention is not so limited. The connections and functions of these modules are illustrated individually below.

The content acquisition module is connected to the content classification and preparation module, and acquires resource information mainly by means of photography, audio recording, computer synthesis and so on, creates multimedia content from the resource information by post-processing such as editing, composing, clipping, rendering, etc., and sends the created media content a content classification and preparation module.

The content classification and preparation module has a receiving terminal connected to the content acquisition module, and a sending terminal connected to the transmission control module. The content classification and preparation module is primarily used to classify the resulting multimedia content, e.g., according to the characteristics of video source effects: distinguishing between real-time and non real-time services, distinguishing the definition (Ultra HD, HD, SD), distinguishing between the dimensions (3D, 2D); according to the categories of the video source content: distinguishing among sport, financial, political, social, educational, historical, variety, drama, film and TV, and so on. Based on the above, further subdivision may be performed. Finally, an index label is created for each video source, which is packaged separately in accordance with the stream format.

The transmission control module controls both the broadcast TV network and the secondary network to transmit content signals to the client terminal. In this invention, multiple broadcast TV networks and secondary networks may coexist, for example, multiple broadcast networks and multiple 3G or LTE networks, etc. may coexist, at least one or more or all of which has information transmissions being controlled by the transmission control module. The transmission control module communicates control signals and content signals with the client terminal via at least one or more or all of the secondary networks. However, for the broadcast TV network, such as the broadcast network, the transmission control module transmits only content signals. In this invention, the control information comprises a VOD request, a broadcast content retransmission request, or a direct video content request.

As a preferred embodiment of this invention, the broadcast TV network (the broadcast network) also includes a multiplexing and distribution module. The transmission control module provides broadcast multimedia content to the multiplexing and distribution module of the broadcast system. The broadcast multimedia content is service content being broadcast, including normal broadcast services on various channels and user's video on demand (VOD) service content on special channels. The multiplexing and distribution module performs channel multiplexing and matching, etc., for the broadcast content provided by the transmission control module (including normal video services, Ultra HD, 3D, special VOD services, etc.), which is then distributed to clients such as stationary TVs, mobile phones, mobile terminals by radio frequency signal broadcasting. The channel multiplexing herein means that a plurality of pieces of content might occupy one frequency resource chronologically or a plurality pieces of content might occupy one time block on different frequency resources.

The secondary network of this invention has a plurality of information transmission channels, typically via a 3G, LTE or WiFi network, connected to the transmission control module. Alternatively, the secondary network may be divided into a frontend and a backend, wherein the frontend is the Internet, and the backend includes a 3G, LTE or WiFi network. The transmission control module has access to the frontend, i.e., the Internet, and the client terminal has access to the backend, i.e., access to a 3G, LTE or WiFi network, etc. The frontend Internet is connected to the backend 3G, LTE or WiFi network, to communicating multimedia services and control signals therebetween.

In this invention, the feedback information comprises acceptance, waiting, or timeout of a VOD request, acceptance, waiting, or timeout of a broadcast content retransmission request, or acceptance, waiting, or timeout of a direct content request. The client terminal may upload control information or video content to the Internet via the 3G, LTE, or WiFi network. The Internet may deliver feedback information, broadcast retransmission content or direct video content from the transmission control module to the client terminal via the 3G, LTE, or WiFi network.

The transmission control module provides multimedia content to the Internet module, and also exchanges control signaling with the Internet. The transmission control module receives control signaling sent from the Internet, including an on-demand (VOD) request, to control the on-demand content output from the transmission control module to the multiplexing and distribution module. After receiving a request from the Internet, the transmission control module will feedback its processing result to the Internet by control signaling, "acceptance" or "waiting". If a predetermined latency expires, "no response" is returned, and then the user may resend the request.

This invention selects the 3G, LTE or WiFi network because 3G, LTE/WiFi base stations are densely deployed in urban regions, thus almost having a seamless coverage. In one aspect, these modules receive control signals from clients (stationary TVs, mobile terminals, etc) via radio frequency, including on-demand requests, direct content requests, and retransmission requests due to a broadcast content package loss, etc, and also (optionally) receive content uploaded from clients, and further upload the content to the Internet. In another aspect, these modules also receive feedback control signaling from the Internet, including a result feedback for the on-demand request (acceptance, waiting, or no response), a feedback for the direct content request (acceptance, waiting, or no response), and a feedback for a lost package retransmission request (acceptance, waiting, or no response), receive the content requested by the client provided from the Internet, and transmit the information received from the Internet module to the requesting client terminal via a radio frequency.

The client terminal has access to the 3G, LTE or WiFi network, and is equipped with a built-in storage device or connected to an external storage device, for storing information received from the broadcast network or the Internet. In another aspect, the client terminal includes an internal evaluation unit for evaluating a channel condition in real-time based on return channels of the information transmission channels of the secondary network, so as to select an optimal information transmission channel.

As another aspect of this invention, the above terrestrial broadcast TV network architecture has two primary control modes.

One control mode is that the secondary network assists the broadcast TV network to achieve collaborative coverage. In particular, the client terminal assesses the broadcast information received from the broadcast network in real-time to identify missing signals in the broadcast information, and sends a retransmission signal to the transmission control module via the 3G, LTE or WiFi network and then the Internet, whereby the transmission control module transmits the missing signals to the client terminal through the Internet and then the 3G, LTE or WiFi network.

Another control mode is that the secondary network controls the broadcast TV network or the secondary network itself. In particular, the client terminal sends an on-demand control signal to the transmission control module through the 3G, LTE or WiFi network and then the Internet, and the transmission control module transmits the on-demand content to the client terminal through the broadcast network, or again through the Internet and then the 3G, LTE or WiFi network.

The two control modes of this invention are illustrated below by embodiments.

In one aspect, the user receives and watches multimedia content through the broadcast network. When a packet loss occurs in the multimedia content received through the broadcast network due to channel environment deterioration, a retransmission request for the lost content (simply referred to lost packet retransmission request) might be sent to the transmission control module through the 3G, LTE or Wifi wireless network and then the Internet. Upon receiving the request, the transmission control module provides a retransmission of the lost content to the client terminal according to normal criteria (for example, the user request arriving first will be processed first), or prioritization criteria (for example, premium users and privileged users are prioritized). If the user request has to wait, the control signaling feedback to the user is waiting, if the user request can be processed directly, then the control signaling of acceptance is returned, or if the user has been waiting for more than a preset value, then the control signaling of "no response" is returned. This service achieves collaborative coverage of heterogeneous networks and the broadcast network, to overcome the deficiency of packet loss in coverage shadow of the broadcast network.

In another aspect, the user may send a video on-demand (VOD) request to the transmission control module through the 3G, LTE or Wifi wireless network and then the Internet, wherein after receiving the request, the transmission control module controls the on-demand content to be transmitted on the broadcast link, and transmits the on-demand content to the user through the broadcast network timely, so as to meet the on-demand needs of the client terminal. This functionality integrates the heterogeneous networks and the broadcast network, enabling bidirectional transmissions with the client end.

In addition, the client terminal may send a direct content request to the transmission control module through the 3G, LTE or Wifi wireless network and then through the Internet. This service intends to enable the client terminal to obtain content from the Internet resources directly. After receiving the request, the transmission control module provides a content service directly to the client terminal based on normal criteria (for example, the user request arriving first will be processed first), or prioritization criteria (for example, premium users and privileged users are prioritized). Similarly, the control signaling may be acceptance, waiting or no response.

When the client terminal selects the 3G, LTE or Wifi access mode, in accordance with the optimal channel criterion, the client terminal evaluates the channel condition in real-time based on the 3G, LTE or Wifi return channel to select an optimal interaction mode. If the client terminal is a mobile device and a network handover is required, it follows the optimal channel criteria for handover.

The terrestrial digital TV network architecture of the invention is primarily applicable to some regions with limited hardware environment, for example in rural areas, without too many obstacles and with a relatively simple channel environment. In this circumstance, the network architecture of the invention applies in two scenarios as following.

When the user is near the TV tower base station and has a Light-of-Sight transmission condition, a direct return uplink may be added on the basis of the broadcast link.

When the user is far from the TV tower base station, or there is no Light-of-Sight transmission between the user and the TV tower base station, a return uplink with repeaters may be added on the basis of the broadcast link.

The network architectures of the invention operable in the above two scenarios are illustrated below with two embodiments.

Figure 4:
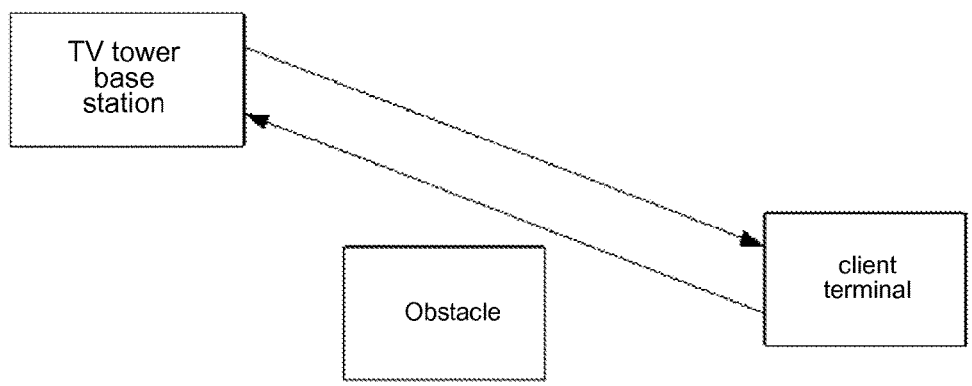
FIG. 4 is a schematic diagram of a network architecture according to a third embodiment of the invention.

As shown in FIG. 4, the network architecture of the invention mainly includes a TV tower base station (for example, a broadcast signal TV tower base station) and a client terminal, as well as an uplink and a downlink between the TV tower base station and the client terminal. When the user is near the TV tower base station and might be in a Light-of-Sight transmission condition, e.g., the user is located within 10 km from the broadcast TV tower base station, a direct return uplink may be added on the basis of broadcast link.

The downlink and uplink utilize a combination of TDD and FDD, wherein the downlink is on a different frequency band from the uplink. The downlink carries broadcast information transmitted to all users in a broadcast mode and proprietary information specific to individual users transmitted in a broadcast or directional transmission mode. The coverage of downlink information is improved by transmitting high rate signals through transmit diversity of the TV tower base station, which is suitable for immersive applications such as SHDTV, HDTV and 3DTV, as well as Rich Media applications. The uplink is accessed according to information in a time-frequency resource table specified individually and delivered on the downlink.

The uplink signal is transmitted by the client terminal in a directional transmission mode, which can be implemented by a directional antenna or through beamforming of an antenna array, thus achieving high system power efficiency, far transmission distance, and security. The modulation and demodulation for the uplink burst transmissions rely on the PSK modulation method with a relatively low peak-to-average power ratio to improve power efficiency. The uplink also employs a multi-rate Turbo convolutional coding technology, and utilizes the long preamble sequence readily to be captured. The MAC layer protocol for the uplink employs the DOCSIS protocol which has been applied in cable TVs, and employs the combined "contention and reservation" resource allocation method, wherein the contention method may be utilized for short data service like a VOD request, and the resource reservation method may be utilized for real-time video call, video interaction service, etc. The frame structure defines essential signaling frames: ranging frame and MAP frame. By division of time slots and subcarrier clusters, it is possible to support a plurality of multi-access modes, such as TDMA, OFDMA or SC-FDMA.

Figure 5:
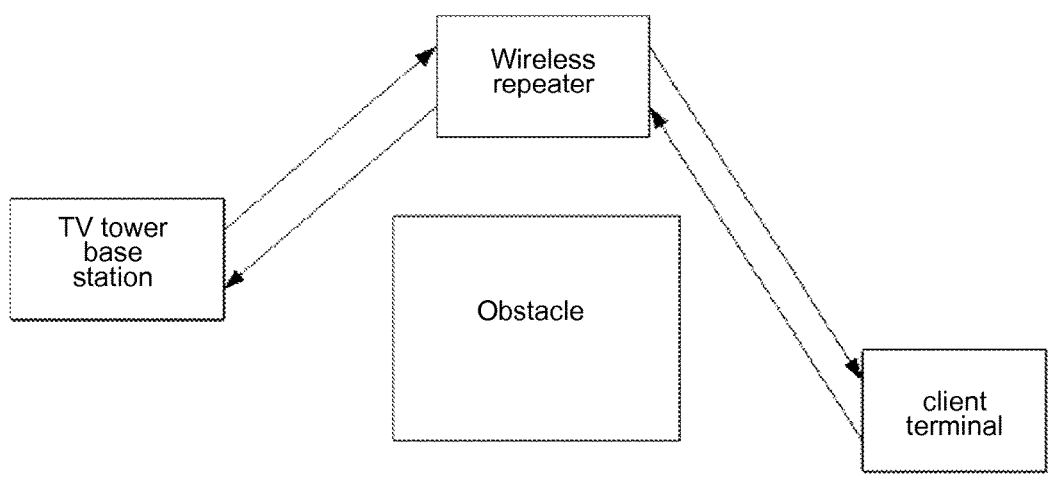
FIG. 5 is a schematic diagram of a network architecture according to a fourth embodiment of the invention.

As shown in FIG. 5, when the user is far from the TV tower base station, for example, when the user is about 10-35 km from the broadcast TV tower base station, there is typically no Light-of-Sight (LoS) path due to occlusion. On the basis of the first embodiment, the invention employs a network architecture with wireless repeaters to extend the coverage of downlink transmissions (there may be multiple wireless repeaters, without being limited to the single repeater mode as shown in FIG. 5). Typically, the wireless repeater includes a pair of back-to-back wireless access points (APs), one for receiving, and the other for transmitting.

In particular, the wireless repeater may use one or more of various wireless forwarding modes, such as analog intra-frequency forwarding, analog inter-frequency forwarding, digital intra-frequency forwarding, digital inter-frequency forwarding, or Bluetooth or Wifi forwarding, etc. The TV tower base station transmits a broadcast signal to the wireless repeater, which forwards the broadcast signal to the client terminal; the client terminal transmits an uplink signal to the wireless repeater, which forwards the uplink signal to the TV tower base station.

Also, when there is no Light-of-Sight transmission in the uplink transmission path, the return uplink with a wireless repeater as in FIG. 5 may be employed to enable the uplink transmission between the client terminal and the TV tower base station. Selecting the coding with a low constellation and a low bit rate can further improve the uplink coverage range, thereby enhancing the capability of direct return uplink.

As known from the above, the TV tower base station implementing this invention includes a receiving device (not shown) and a transmitting device (not shown), wherein the transmitting device transmits information to the client terminal at a first frequency in a broadcast mode, and the receiving device receives information transmitted from the client terminal at a second frequency. Moreover, the information transmitted from the transmitting device in the broadcast mode includes broadcast information transmitted to all users and proprietary information specific to individual users. The receiving device receives the information transmitted from the client terminal according to a time-frequency resource table for the client terminal.

Meanwhile, the client terminal implementing this invention also includes a receiving device (not shown) and a transmitting device (not shown), wherein the receiving device receives information sent by the TV tower base station in a broadcast mode at a first frequency, and the transmitting device transmits information to the TV tower base station at a second frequency. Moreover, the client terminal transmits information to the TV tower base station in a directional transmission mode, which can be implemented by a directional antenna or through beamforming of an antenna array.

Those skilled in the art shall appreciate that the specification above illustrates one or more of the numerous embodiments of this invention, rather than limiting thereof. Any equivalent modification, variations and equivalents to the above embodiments, that are consistent with the substantial spirit and scope of this invention, fall within the scope of the claims of this invention.

What is claimed is:

1. A client terminal, comprising:
a first receiving module for connecting with a broadband communication network, and a second receiving module for connecting with a digital TV broadcast system, wherein the client terminal is operable to receive, via the second receiving module, an information index transmitted by the digital TV broadcast system, and to retrieve corresponding information content from the broadband communication network via the first receiving module based on the information index, the broadband communication network deploys an edge server that is close to the client terminal, popular content is sent to the edge server through an information channel between the digital TV broadcast system and the edge server, wherein the client terminal connects to the broadband communication network via the edge server, wherein the client terminal receives the information index of popular content from the second receiving module via the digital TV broadcast system, such that the client terminal is operable to retrieve the corresponding popular content from the edge server via the first receiving module based on the information index of the popular content.

2. The client terminal of claim 1, wherein the client terminal receives, via the second receiving module, the content transmitted by the digital TV broadcast system, and selectively stores and recommends the content according to a user's behavior habits.

3. The client terminal of claim 2, wherein the client terminal is operable to directly retrieve information content from the broadband communication network via the first receiving module.

4. The client terminal of claim 1, wherein the digital TV broadcast system coordinates with the broadband communication network by connecting to a content clustering server, wherein the content clustering server chooses popular content from a plurality of data sources and generates an information index,
    wherein the client terminal selectively downloads some of the popular content from the edge server to the client terminal according to the user's behavior habits, and recommends the content to the user.

\* \* \* \* \*

UNITED STATES PATENT AND TRADEMARK OFFICE
CERTIFICATE OF CORRECTION

PATENT NO. : 9,800,902 B2  
APPLICATION NO. : 14/413228  
DATED : October 24, 2017  
INVENTOR(S) : Wenjun Zhang et al.

Page 1 of 1

It is certified that error appears in the above-identified patent and that said Letters Patent is hereby corrected as shown below:

On the Title Page

On page 2, item (30) Foreign Application Priority Data, the second priority application:  
Jul. 7, 2012 (CN) -------------------- 2012 1 0233919  
Please delete "Jul. 7, 2012" and add "Jul. 6, 2012"

Signed and Sealed this  
Twenty-third Day of January, 2018

Joseph Matal  
*Performing the Functions and Duties of the*  
*Under Secretary of Commerce for Intellectual Property and*  
*Director of the United States Patent and Trademark Office*